United States Patent
Huang

(10) Patent No.: US 6,518,500 B1
(45) Date of Patent: Feb. 11, 2003

(54) WIRE-COLLECTING BOX WITH SERIES CONNECTION

(76) Inventor: Yea Yen Huang, No. 12, Alley 70, Sec. 1, Chung Hua Road, Tocheng City, Taipei Hsien (TW)

( * ) Notice: Subject to any disclaimer, the term of this patent is extended or adjusted under 35 U.S.C. 154(b) by 0 days.

(21) Appl. No.: 10/186,974

(22) Filed: Jul. 2, 2002

(30) Foreign Application Priority Data

May 9, 2002 (TW) .......................................... 91206609

(51) Int. Cl.⁷ ................................................ H02G 3/08
(52) U.S. Cl. ............................ 174/50; 174/58; 174/60; 220/4.02; 439/535; 248/906
(58) Field of Search .............................. 174/50, 48, 58, 174/60, 66; 220/3.2, 4.02, 241; 439/535; 248/906

(56) References Cited

U.S. PATENT DOCUMENTS

| | | | |
|---|---|---|---|
| 3,424,509 A | * | 1/1969 | Siklos ..................... 174/50 X |
| 3,683,102 A | * | 8/1972 | Moran et al. .................. 174/50 |
| 5,086,194 A | * | 2/1992 | Bruinsma ..................... 174/48 |
| 6,274,809 B1 | * | 8/2001 | Pudims et al. ............ 174/50 X |
| 6,441,302 B1 | * | 8/2002 | Wu .............................. 174/50 |

* cited by examiner

Primary Examiner—Chau N. Nguyen
Assistant Examiner—Dhiru R Patel
(74) Attorney, Agent, or Firm—Troxell Law Office PLLC

(57) ABSTRACT

This invention relates to a wire-collecting box which make use of a box body with hollow interior, matching up with a rotating plate base capable of combining together, relying on the slotting buckled stick protruding out to the center of the plate base to slip on the buckled opening of the box body, so that electric wires and the like can pass through the slotting of the buckled stick and wires can be rolled and circled to fit into the wire-collecting box as rotating the plate disk, and combined the plate disk, connecting a plurality of wire-collecting boxes in series by one connection plate.

4 Claims, 4 Drawing Sheets

WIRE-COLLECTING BOX WITH SERIES CONNECTION

BACKGROUND OF THE INVENTION

Since computer or electronic products are created and presented, the medium power lines or signal lines are increased every moment. Furthermore, technicians of various works need to use all kinds of wires. For example, hard-core thin electronic wires by communication staffs, welded wires by electronic staffs, or bagged metal bundled wires by salesmen . . . etc, all need to use wire-collecting boxes.

But general wire-collecting boxes, such as whirling-cover type, squeezed type or roller type . . . etc, all haven't been used popularly because of the lack of convenience and practicability. In consideration of this conceives the inventor to study and develop the present product. The present invention is not only provided with good wire-collecting function, but can also connect wire-collecting boxes of the same size or different size with each other in series combination, which provides the convenience in use and makes it easier to arrange and save space.

The technical characteristics of the present invention relates to the use of box body with hollow interior for collecting wires, matching up with a rotating plate base capable of combining together, where the slotting buckled stick protruding out vertically to the center of the plate base to slip on the buckled opening of the box body, making the plate disk and the box body combined together as a rotatable box body with hollow center. As carrying out, pass the wires and the like through the slotting of the buckled stick and rotate the plate base to roll and circle the wires into the wire-collecting box. Besides, combined openings are disposed both in the box body and the plate disk, connecting a plurality of wire-collecting boxes in series by one connection plate or directly disposing the connection plate outside the box body or plate base.

SUMMARY OF THE INVENTION

The present invention relates to a wire-collecting box with good wire-collecting function and is provided with series connection, which makes use of a box body with hollow interior, matching up with a rotating plate base capable of combining together, relying on the slotting buckled stick protruding out to the center of the plate base to slip on the buckled opening of the box body, so that electric wires and the like can pass through the slotting of the buckled stick and wires can be rolled and circled to fit into the wire-collecting box as rotating the plate disk, and combined opening are disposed both in the box body and the plated disk, connecting a plurality of wire-collecting boxes in series by one connection plate.

DETAILED DESCRIPTION OF THE PREFERRED EMBODIMENT

Figure 1:
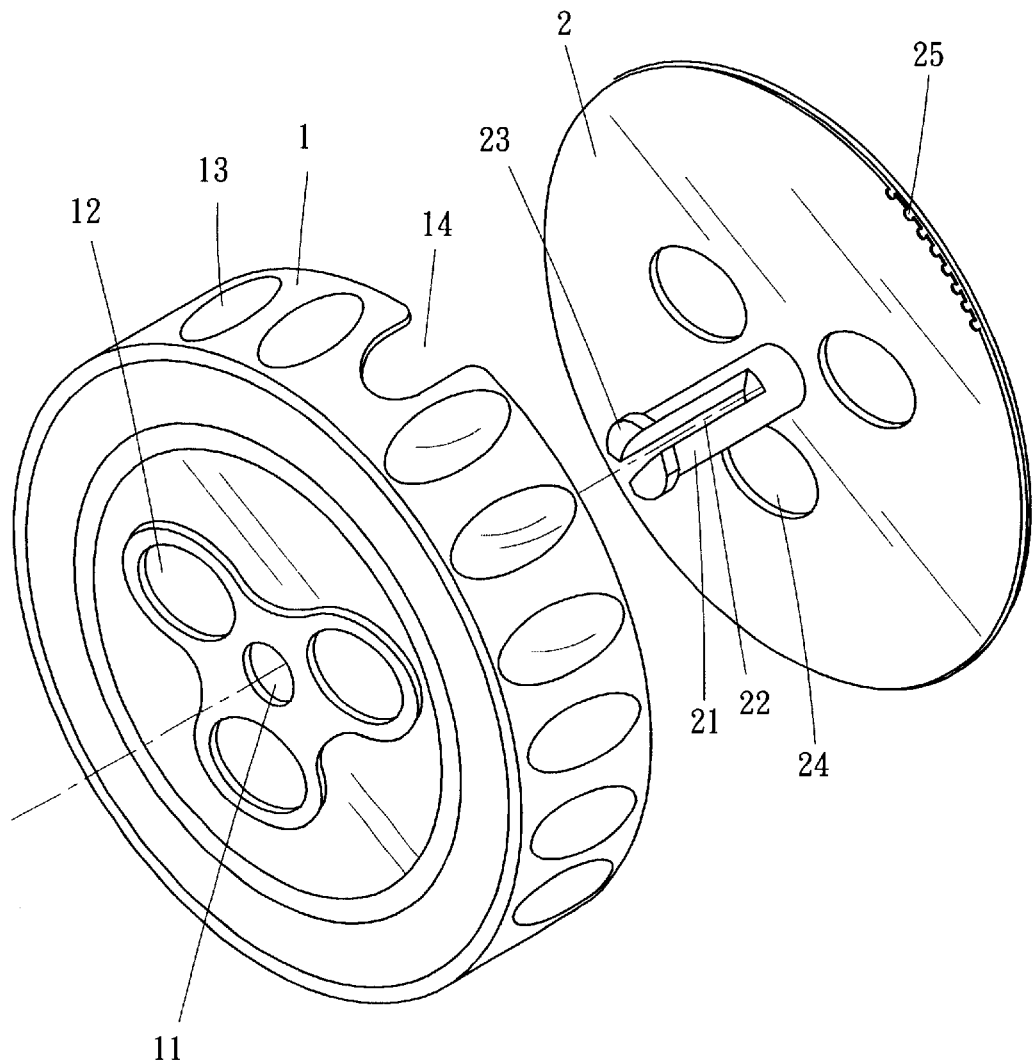
FIG. 1 is the exploded three-dimensional view of the present invention.
Figure 2:
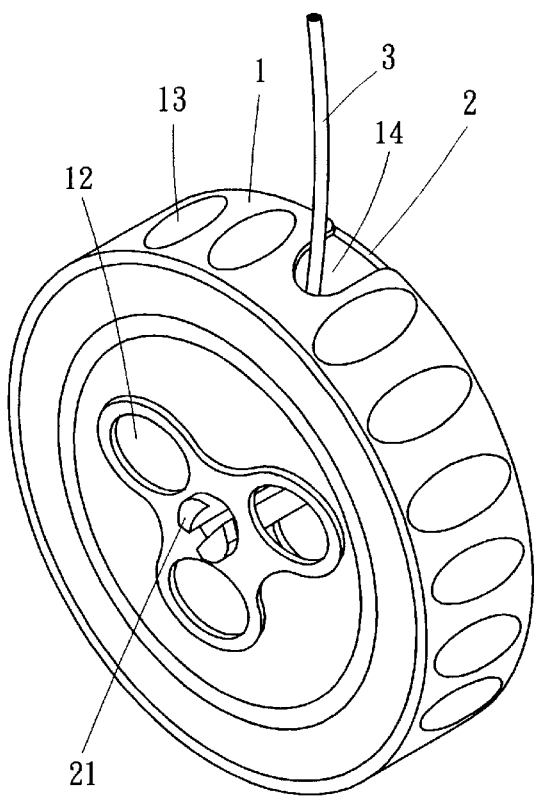
FIG. 2 is the three-dimensional view of wire collection of the single opening box body according to the embodiment of the present invention.
Figure 3:
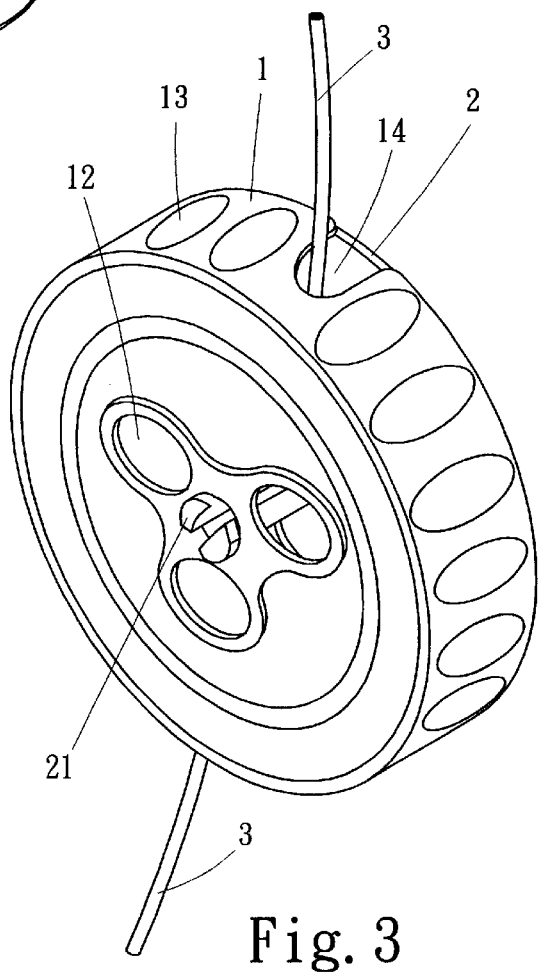
FIG. 3 is the three-dimensional view of wire collection of the double openings box body according to the embodiment of the present invention.

As shown in FIG. 1, the present invention "Wire-Collecting Box with Series Connection" mainly comprises a box body with hollow interior capable of collecting wires 1, and a rotating plate base 2 that can be combined with the box body 1. The said box body 1 is hollow internally for the space of collecting wire bodies. A buckled opening 11 is disposed on the central area of the box body 1. Several combination opening 12 are disposed at proper locations of the rim of buckled opening 11, and there are arc holding indentions 13 and one or two slotted openings 14 disposed equidistantly on the periphery of the box body for collecting one wire body or collecting two wires at the same time.

As shown in FIG. 1 as well, a protruded buckled stick 21 with vertical slotting 22 preserved is disposed at the position at the center of the plate base 2 facing the buckled opening 11 of the box body. The rim of the buckled stick 21 looks like a buckled hook 23. A combination opening 24 is also disposed at the position on the plate of the plate base 2 facing the combination opening 12 of the box body 1 described above. The said vertical slotting 22 makes the front end of the buckled stick 21 an elastomer to facilitate the buckled stick 21 sheathing to the buckled opening 21 of the box body 1 to combine the box body 1 and the plate base 2, or pulling out from the buckled opening 11 to separate both parts. Further, the vertical slotting 22 makes the collected wire body 3 passing through the said vertical slotting and orienting to a fixed position. The wire body 3 also passes in and out the slotted opening.

Besides, symmetric intended opening 25 and protruded point may be disposed at the contact part of the box body 1 and plate base 2, respectively, to make it stuck with feedback sound "Ta-Ta" and the effect of the sense of touch while rotating both parts.

As embodying, the buckled stick 21 sheathes to the buckled opening 11 of the box body 1, which makes the plate base 2 and the box body 1 combined as a rotatable box body with hollow center capable of passing wire body 3 and the like through the vertical slotting 22 of the buckled stick, followed by rotating the box body 1 and the plate base 2 mutually so as to collecting wires into the collecting box or directly pull the wire body 3 out while using.

Figure 4:
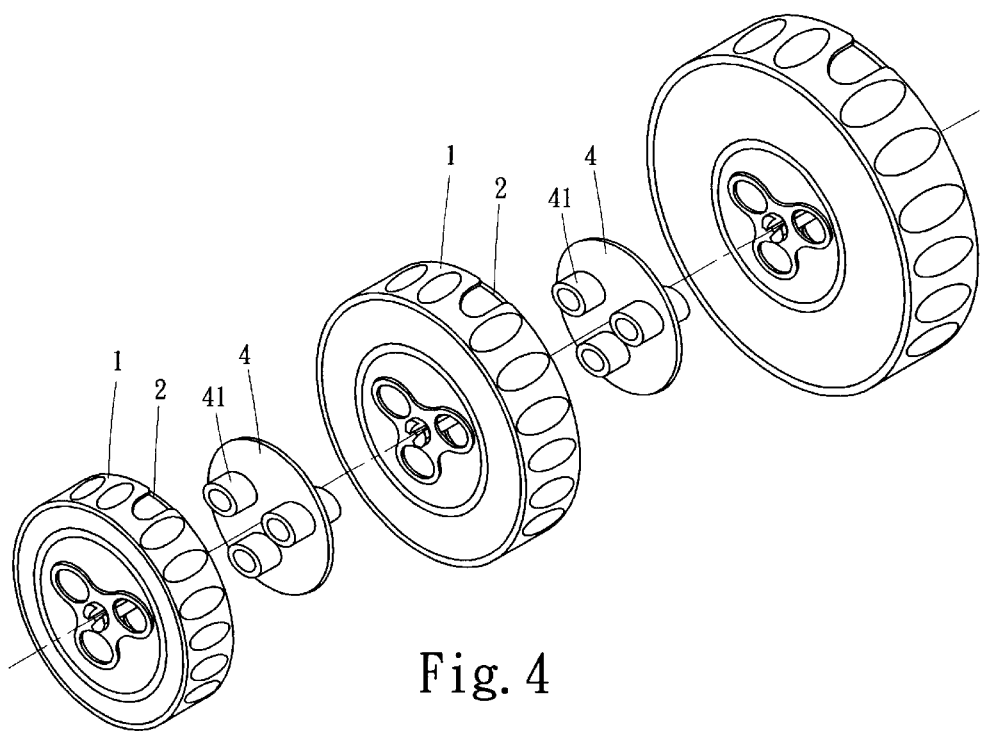
FIG. 4 is the exploded three-dimensional view of the box bodies of different size in series of the present invention.
Figure 5:
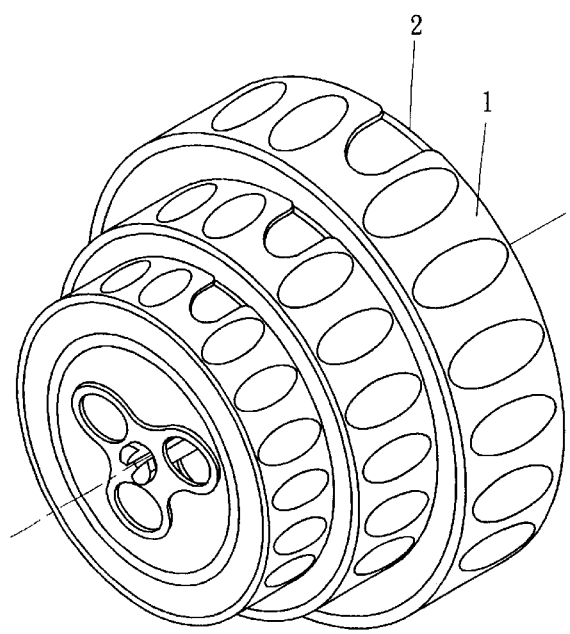
FIG. 5 is the three-dimensional view of the box bodies of different size in series according to the embodiment of the present invention.

As shown in FIG. 4 and FIG. 5, the combination openings 12–24 of the box body 1 and plate base 2 connect several collecting box with same or different volumes (but uniform combination openings) in series by sheathing the protruded stick 41 of the connection plate 4 with protruded stick 41 to the combination openings 12–24, respectively.

Figure 6:
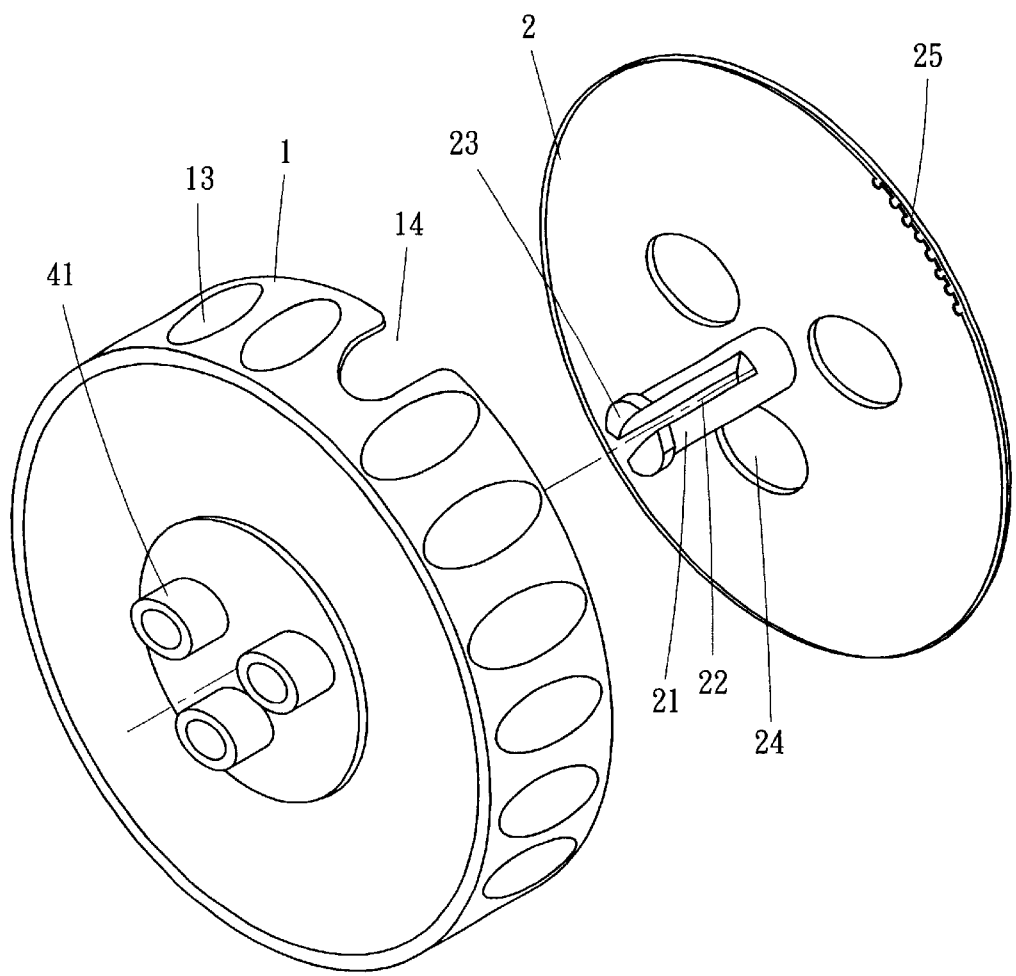
FIG. 6 is the three-dimensional view of directly disposing the connection plate outside the box body according to the embodiment of the present invention.

As shown in FIG. 6, as embodying, several collecting boxes can also be combined in series for use by disposing the protruded stick 41 of the connection plate 4 outside the box body 1 or the plate base 2 directly, while the independent connection plate 4 can be omitted. Accordingly, the present invention is not only provided with good wire-collecting function, but is also capable of combining collecting boxes with same sizes or different sizes but same structures mutually in series, to provide the convenience in use and the easiness of arrangement and space-saving.

What is claimed is:

1. A wire-collecting box comprising:

a box body with hollow interior for collecting a plurality of wires, a buckled opening on a central area of said box body, a first plurality of openings at a rim of said buckled opening, arc holding indentions and a plurality of slotted openings disposed equidistantly on a periphery of said box body for collecting said plurality of wires, a plate base having a protruded buckled stick with a vertical slotting at a center of said plate base facing said buckled opening of the box body, a rim of the buckled stick having a buckled hook, said plate base having a second plurality of openings facing said first plurality of openings of said box body, said vertical slotting making a front end of said buckled stick an elastomer to facilitate combining said box body and said plate base by using said protruded buckled stick, or pulling out from the buckled opening to separate said box body and said plate base, said plurality of wires passing through said vertical slotting and orienting to a fixed position, said plurality of wires also passes in and out the vertical slotting.

2. The wire-collecting box according to claim 1, further comprising a connection plate with a protruded stick between the box body and the plate base, said connection plate used to combine several wire-collecting boxes in series by said protruded stick and said first plurality of openings.

3. The wire-collecting box according to claim 2, wherein several collecting boxes are combined in series by disposing the protruded stick of the connection plate outside the box body or the plate base.

4. The wire-collecting box according to claim 1, wherein a symmetric intended opening and protruded point are disposed at a contact part of the box body and plate base, respectively.

* * * * *